United States Patent
Ito et al.

(10) Patent No.: US 9,348,083 B2
(45) Date of Patent: May 24, 2016

(54) LIGHT GUIDING UNIT, AND LIGHT ILLUMINATING DEVICE AND IMAGE READING APPARATUS USING THE SAME

(71) Applicant: CANON KABUSHIKI KAISHA, Tokyo (JP)

(72) Inventors: Narumasa Ito, Utsunomiya (JP); Takayuki Sugiyama, Utsunomiya (JP); Ikutaro Mitsutake, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/849,926

(22) Filed: Sep. 10, 2015

(65) Prior Publication Data

US 2016/0085016 A1    Mar. 24, 2016

(30) Foreign Application Priority Data

Sep. 24, 2014    (JP) ................. 2014-193351

(51) Int. Cl.
*H04N 1/04*    (2006.01)
*F21V 8/00*    (2006.01)
*H04N 1/028*    (2006.01)

(52) U.S. Cl.
CPC ............ *G02B 6/0035* (2013.01); *G02B 6/0073* (2013.01); *H04N 1/0284* (2013.01); *H04N 1/0289* (2013.01); *H04N 1/02835* (2013.01)

(58) Field of Classification Search
CPC ............. H04N 9/3155; H04N 1/0289; H04N 2201/0081; F21V 13/02; F21V 33/0052; F21V 5/02; F21V 13/04; F21V 5/005; F21V 7/10; F21V 7/04; F21K 9/58; F21Y 2101/02; F21Y 2103/003

USPC .......... 358/475, 482, 483, 484, 509; 362/235, 362/293, 300, 606, 339, 311.01, 326; 399/177

See application file for complete search history.

(56) References Cited

U.S. PATENT DOCUMENTS 5,863,114 A * 1/1999 Nagatani ................... F21V 5/02
                                              362/23.16
6,494,586 B1 * 12/2002 Huang ............... H04N 1/02815
                                                 349/63

(Continued)

FOREIGN PATENT DOCUMENTS

JP    2009037746 A    2/2009
JP    2010050100 A    3/2010

(Continued)

*Primary Examiner* — Negussie Worku
(74) *Attorney, Agent, or Firm* — Rossi, Kimms & McDowell LLP

(57) ABSTRACT

Provided is a light guiding unit including: a light guiding member including an incident surface, an exit surface elongated in a first direction, and a light guiding surface opposed to exit surface; and a diffusion member opposed to light guiding surface, in which: light entering the light guiding member from incident surface is guided via light guiding surface and diffusion member to exit surface, and exits from exit surface to illuminate the original; the light guiding member further includes a plurality of prisms arrayed in first direction on light guiding surface on a side opposed to diffusion member; each of prisms has a rectangular shape in a first section; and each of prisms satisfies the following condition: $W \tan(\sin^{-1}(1/n)) \leq H \leq 2W$, where W and H represent a width and a height of each of prisms in the first section, respectively, and n represents a refractive index of the light guiding member.

11 Claims, 5 Drawing Sheets

(56) References Cited

U.S. PATENT DOCUMENTS

| | | | |
|---|---|---|---|
| 6,742,907 B2 | 6/2004 | Funamoto et al. | |
| 7,529,000 B2 * | 5/2009 | Ishida | H04N 1/00588 358/468 |
| 8,011,802 B2 * | 9/2011 | Hoshi | G02B 5/045 362/227 |
| 8,727,591 B2 * | 5/2014 | Mochizuki | G02B 6/001 362/551 |
| 2003/0206408 A1 | 11/2003 | Funamoto et al. | |
| 2009/0096956 A1 * | 4/2009 | Uehara | G02B 6/0053 349/64 |
| 2009/0147179 A1 * | 6/2009 | Yamashita | G02B 5/0221 349/64 |
| 2011/0051046 A1 * | 3/2011 | Kim | G02B 5/02 349/65 |
| 2011/0299295 A1 * | 12/2011 | Mochizuki | G02B 6/001 362/558 |
| 2014/0355296 A1 | 12/2014 | Shigoku | |
| 2015/0062493 A1 * | 3/2015 | Yoon | G02B 6/0053 349/65 |
| 2015/0189117 A1 * | 7/2015 | Okamoto | H04N 1/02815 358/475 |
| 2015/0219831 A1 * | 8/2015 | Tanaka | G02B 6/0051 349/62 |

FOREIGN PATENT DOCUMENTS

| | | |
|---|---|---|
| JP | 2011071696 A | 4/2011 |
| JP | 2014232982 A | 12/2014 |
| WO | 2008013234 A1 | 1/2008 |

* cited by examiner

LIGHT GUIDING UNIT, AND LIGHT ILLUMINATING DEVICE AND IMAGE READING APPARATUS USING THE SAME

BACKGROUND OF THE INVENTION

1. Field of the Invention

The present invention relates to a light guiding unit, and a light illuminating device and an image reading apparatus using the same. In particular, the present invention is suitable for an image reading apparatus configured to illuminate an original surface to read an image in a line sequential system, such as an image scanner, a copying machine, and a fax machine.

2. Description of the Related Art

Hitherto, there has been known a technology of using a light emitting diode (LED) as a light source for an original illuminating device that is a light illuminating device in an image reading apparatus. The light illuminating device may be classified into an array arrangement-type light illuminating device in which a plurality of LEDs are arranged in a main scanning direction, and an end portion arrangement-type light illuminating device in which an LED is arranged at a longitudinal end portion of a translucent light guiding member made of a resin or the like, to thereby propagate light fluxes emitted from the light source through the light guiding member.

Recently, the luminous efficiency of the LED is enhanced, and hence there is a demand for the end portion arrangement-type light illuminating device in which the usage number of LEDs can be reduced. The end portion arrangement type has a problem in that, as compared to the array arrangement type, the illuminance of a part of a region to be illuminated on an original reading surface, which is close to an end surface into which light from the LED enters (incident surface), is less liable to be enhanced. This problem attributes to an optical path length of a light beam emitted from the LED to enter the light guiding member, which is reflected by a diffusion surface formed in a longitudinal direction (main scanning direction) of the light guiding member to pass through a light guiding member exit surface and reach an original surface, and attributes to an angle of the light beam reflected at the diffusion surface.

In particular, when the diffusion surface has a saw-like triangular prism or trapezoidal prism shape, the angle of the light beam traveling toward the original surface tends to be directed in a direction in which the light beam is separated from the end surface (incident surface), and hence the illuminance near the end surface (incident surface) has been less liable to be enhanced.

Further, when the object to be read has a large thickness, there has been a problem in that the shadow of the three-dimensional object tends to be generated only in one direction of the longitudinal direction (main scanning direction). That is, similarly to the problem in that the illuminance near the end surface (incident surface) is less liable to be enhanced, the angle of the light beam traveling toward the original surface tends to be directed in the direction in which the light beam is separated from the end surface (incident surface), and hence there has been a problem in that the shadow is generated due to the thickness of the object to be read.

As a proposal for addressing such problems, in Japanese Patent Application Laid-Open No. 2011-71696, there is disclosed a technology for improving the main scanning illuminance by extending the light guiding member in the main scanning direction so that the light beam totally reflected by the diffusion surface (saw-like triangular prism shape) of the light guiding member illuminates a predetermined illuminance region.

Further, in Japanese Patent Application Laid-Open No. 2009-37746, there is disclosed a technology for suppressing the shadow of the three-dimensional object by forming a surface of a reflective plate, which is arranged to be opposed to the diffusion surface (saw-like triangular prism shape) of the light guiding member, into a concavo-convex shape.

A downsized image reading apparatus has a high need. In contrast to this demand, in Japanese Patent Application Laid-Open No. 2011-71696, the light guiding member is extended in the main scanning direction, which is unsuitable for downsizing. Particularly in the end portion arrangement type, members such as the light guiding member, the LED light source, and a radiator member are arranged in the longitudinal direction (main scanning direction) of the light guiding member, and hence extending the light guiding member in its longitudinal direction (main scanning direction) is closely associated with upsizing of the apparatus.

Further, in Japanese Patent Application Laid-Open No. 2009-37746, the surface of the reflective plate is formed into a concavo-convex shape, but when the relative position between the pitch or shape of the diffusion surface of the light guiding member and the pitch or shape of the concavo-convex shape of the reflective plate is misaligned in the longitudinal direction (main scanning direction), the shadow of the three-dimensional object may be generated. Therefore, in addition to the requirement of the high positional accuracy between the light guiding member and the reflective plate, there is a fear in that the pitch or shape of the diffusion surface of the light guiding member may be shifted due to thermal expansion caused by the heat generated by the LED light source.

SUMMARY OF THE INVENTION

The present invention has an object to provide a light guiding unit, and a light illuminating device and an image reading apparatus using the same, which are capable of, while suppressing increase in longitudinal length of a light guiding member, increasing the illuminance even near an end surface (incident surface) of the light guiding member and suppressing a shadow of a three-dimensional object, without requiring a high positional accuracy.

In order to achieve the above-mentioned object, according to one embodiment of the present invention, there is provided a light guiding unit, which is to be used in an image reading apparatus configured to read an original, the light guiding unit including: a light guiding member including an incident surface, an exit surface that is elongated in a first direction, and a light guiding surface opposed to the exit surface; and a diffusion member opposed to the light guiding surface, in which: light entering the light guiding member from the incident surface is guided via the light guiding surface and the diffusion member to the exit surface, and exits from the exit surface to illuminate the original; the light guiding member further includes a plurality of prisms arrayed in the first direction on the light guiding surface on a side opposed to the diffusion member; each of the plurality of prisms has a rectangular shape in a first section including the first direction and being perpendicular to the light guiding surface; and each of the plurality of prisms satisfies the following condition: $W\tan(\sin^{-1}(1/n)) \leq H \leq 2W$, where $W$ represents a width of the each of the plurality of prisms in the first section, $H$ represents a height of the each of the plurality of prisms, and $n$ represents a refractive index of the light guiding member.

Further features of the present invention will become apparent from the following description of exemplary embodiments with reference to the attached drawings.

DESCRIPTION OF THE EMBODIMENTS

Now, description is made of embodiments of the present invention with reference to the drawings.

First Embodiment

Image Reading Apparatus

Figure 1:
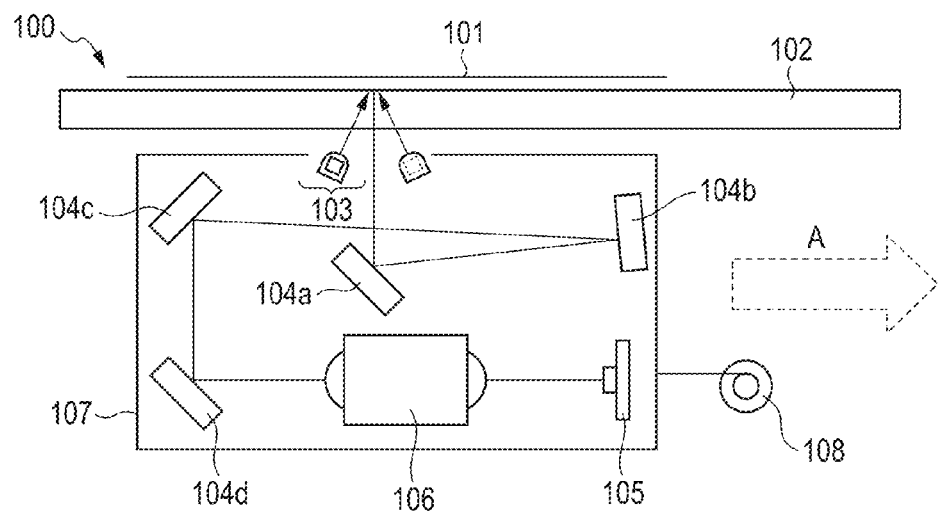
FIG. 1 is a main-part schematic view of an image reading apparatus using a light guiding unit according to a first embodiment of the present invention.

FIG. 1 is a sub-scanning sectional view of an image reading apparatus 100 having mounted thereon a light guiding unit and an original illuminating device serving as a light illuminating device according to an embodiment of the present invention. A "main scanning direction", a "sub-scanning direction", a "main scanning section", and a "sub-scanning section" herein are defined as follows. That is, the main scanning direction refers to the direction perpendicular to the drawing sheet of FIG. 1 (first direction being a longitudinal direction), the sub-scanning direction refers to the A direction (second direction) in the drawing sheet, the main scanning section refers to a cross section (first cross section) including the first direction and the second direction, and the sub-scanning section refers to a cross section (second cross section) of the drawing sheet of FIG. 1.

In FIG. 1, an integrated scanning optical system unit (carriage) 107 includes a reading unit (line sensor or image sensor) 105 configured to read light fluxes from an original 101 illuminated by an original illuminating device 103 configured to illuminate the original 101 placed on an original platen glass (original platen) 102. Further, the carriage 107 includes a plurality of folding mirrors 104a to 104d configured to guide the light fluxes from the original 101 to the reading unit 105, and a reducing optical system (imaging lens) 106 serving as an image reading optical system, which is configured to image the light fluxes on the surface of the reading unit 105 being an image plane based on image information from the original 101.

The carriage 107 configured as described above is scanned in the arrow A direction (sub-scanning direction) indicated in FIG. 1 by a driving motor (sub-scanning motor) 108 serving as a driving unit. The elements constructing the carriage 107 do not change their relative positional relationship while scanning the original.

In FIG. 1, the plurality of folding mirrors include, sequentially along an optical path from the original 101 side, the first folding mirror 104a, the second folding mirror 104b, the third folding mirror 104c, and the fourth folding mirror 104d. The respective mirrors are arranged so that the light fluxes from the original 101 travel from the first folding mirror 104a to reach the second folding mirror 104b, further travel from the second folding mirror 104b to reach the third folding mirror 104c, and further travel from the third folding mirror 104c to reach the fourth folding mirror 104d.

Then, the light fluxes that have reached the fourth folding mirror 104d are imaged on the surface of the reading unit 105 by the imaging optical system 106. In such a configuration, the image information of the original read by the reading unit 105 is transmitted to a specific image processing unit (not shown) as electrical signals, and is subjected to specific signal processing to be output thereafter. Further, the image reading apparatus 100 also includes a power supply unit (not shown) configured to drive this apparatus.

(Light Illuminating Device)

Figure 2:
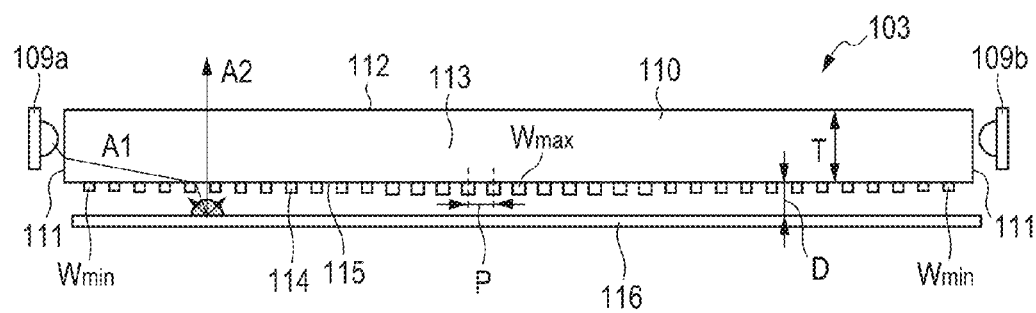
FIG. 2 is a main-part schematic view of an original illuminating device serving as a light illuminating device using the light guiding unit according to the first embodiment.

The original illuminating device 103 serving as the light illuminating device according to the first embodiment of the present invention is described in more detail. FIG. 2 is a longitudinal (main scanning) sectional view of the original illuminating device 103 according to this embodiment. The original illuminating device 103 includes light sources 109a and 109b that are high-brightness white LEDs, a light guiding member 110 serving as a light guiding unit described in detail later, and a diffusion/reflection member 116 serving as a diffusion member.

One light source 109a and one light source 109b are arranged at both end portions of the light guiding member 110 in the longitudinal direction (main scanning direction), respectively. The diffusion/reflection member 116 is formed of, for example, a white sheet, which is, in this embodiment, a white sheet made of polyethylene terephthalate (PET resin) mixed with fine titanium dioxide particles. The light guiding member 110 is formed of a glass material or an optical member made of a synthetic resin such as plastic. In this embodiment, an acrylic resin (PMMA) being an easily-moldable plastic material is used.

(Light Guiding Unit)

The light guiding unit according to this embodiment includes the light guiding member and the diffusion member. The light guiding member has an incident surface, an exit surface that is elongated in the first direction, and a light guiding surface opposed to the exit surface. The diffusion member is opposed to the light guiding surface. Light entering the light guiding member from the incident surface is guided via the light guiding surface and the diffusion member to the exit surface. That is, the light guiding unit obtained by excluding the light sources 109a and 109b from the original illuminating device 103 includes the light guiding member 110 and the diffusion/reflection member 116 serving as the diffusion member. Then, as illustrated in FIG. 2, the light guiding member 110 has end surfaces (incident surfaces) 111 into which light from the light source 109a and the light source 109b, which are arranged at both the end portions in the longitudinal direction (first direction, main scanning direction), enters.

Further, the light guiding member 110 has a first side surface 112 serving as the exit surface from which light from the light sources exits toward the original 101, and a second side surface 115 serving as the light guiding surface that is opposed to the first side surface. The second side surface 115 includes a first region and a second region, and extends in the longitudinal direction (main scanning direction). Further, the light guiding member 110 has two opposing reflection side surfaces 113 that connect the first side surface 112 and the second side surface 115 to each other.

In this case, a reflection surface is formed in the first region of the second side surface 115. Further, in the second region of the second side surface 115, a prism 114 having a rectangular shape in a first section including the longitudinal direction and being orthogonal to the second side surface is formed as a protrusion directed toward a side separating from the first side surface (outer side). Then, in the second side surface 115, a plurality of first regions and a plurality of second regions are formed alternately in the longitudinal direction (first direction). As described above, on the side opposed to the diffusion/reflection member 116 of the second side surface 115 serving as the light guiding surface, a plurality of prisms 114 are formed, which are arrayed in the longitudinal direction (first direction).

In this embodiment, the "rectangular shape" refers to not only a rectangular shape, but also a substantially rectangular shape. It is preferred that the angle $(180°-\theta)$ of a lateral side with respect to a bottom side be $90° \leq 180°-\theta \leq 100°$ (that is, $80° \leq \theta \leq 90°$).

A length of the light guiding member 110 in the main scanning direction of this embodiment is 320 mm, and a height T from the second side surface 115 to the first side surface 112 is 6 mm.

(Second Side Surface 115)

Now, the second side surface 115 is described with reference to FIG. 2, FIG. 3A, and FIG. 3B. As described above, in the second side surface 115, the reflection surface is formed in the first region, which functions as a reflecting portion that reflects incident light with an incident angle of a critical angle or more (but functions as a transmitting portion for incident light with an incident angle smaller than the critical angle). Further, in the second region of the second side surface 115, the prism (cuboid prism) 114 having the rectangular shape in the first section including the longitudinal direction and being orthogonal to the second side surface and in the second section orthogonal to the first section is formed as the protruding portion on the side separating from the first side surface.

When, in the longitudinal direction (main scanning direction), the center interval (pitch) of the prisms 114 is represented by P and the width of the prism 114 is represented by W, in this embodiment, the pitch P of the prisms 114 is constant in the entire 320-mm region in the main scanning direction. On the other hand, the prism width W of the prism 114 is varied in the longitudinal direction (main scanning direction) to have a minimum width Wmin near the end portion in the longitudinal direction (main scanning direction) (incident surface 111 of light from the light source 109a), and have a maximum width Wmax in the vicinity of the center portion in the longitudinal direction (main scanning direction).

Note that, the prism width W in the vicinity of the end surface (incident surface) 111 into which light from the light source 109b on the opposite side to the light source 109a enters is similarly varied in the longitudinal direction (main scanning direction) from Wmin to Wmax in the vicinity of the center portion in the longitudinal direction (main scanning direction).

When the longitudinal width of the prism 114 is represented by W (inclined angle is 90°, and hence matches with the average width W in one prism), the height in the direction orthogonal to the longitudinal direction is represented by H, and the refractive index of the prism 114 is represented by n, the prism 114 is shaped to satisfy the following expression.

$$W \tan(\sin^{-1}(1/n)) \leq H \leq 2W \quad (1)$$

Conditional Expression (1) defines the height of the prism 114. Through definition of the prism height H within a range of Conditional Expression (1), a sufficient longitudinal (main scanning) illuminance distribution can be obtained, in which local unevenness is suppressed to be generated in the longitudinal illuminance distribution. The unevenness in the longitudinal (main scanning) illuminance distribution is hereinafter referred to as "longitudinal ripple (main scanning ripple)".

When the height falls below the lower limit value of Conditional Expression (1), a local main scanning ripple is generated, and thus a sufficient main scanning illuminance distribution cannot be obtained. Now, the main scanning ripple is described with reference to FIG. 3A and FIG. 3B. FIG. 3A is an explanatory view for illustrating the reflection surface of this embodiment, and FIG. 3B is an explanatory view for illustrating the reflection surface when the height falls below the lower limit value of Conditional Expression (1).

Among light beams A1 reaching the prism 114, a maximum value $\alpha$max of an angle $\alpha$ formed by the side surface of the prism 114 and the light beam A1 is 90°, which corresponds to substantially normal light, and a minimum value $\alpha$min thereof is $\sin^{-1}(1/n)°$, which corresponds to a critical angle. The angle $\alpha$ of the light beam A1 reaching the prism 114 falls within the following range.

$$\sin^{-1}(1/n) \leq \alpha < 90$$

Figure 3A:
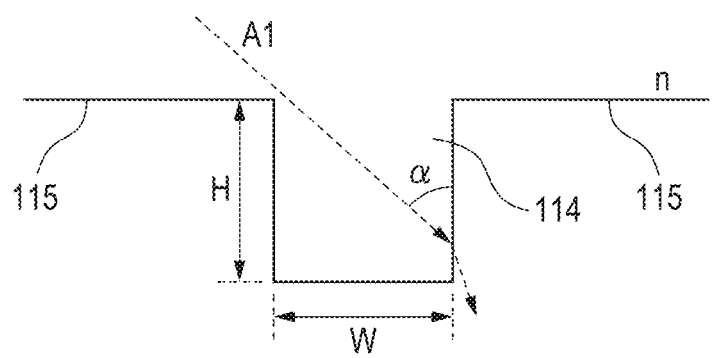
FIG. 3A is an explanatory view of a case where light from a light source is refracted at a prism in the light guiding unit according to the first embodiment.
Figure 3B:
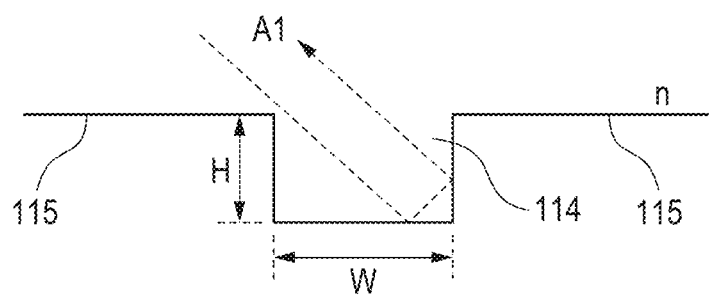
FIG. 3B is an explanatory view of a case where the light is reflected without being refracted at the prism in the light guiding unit according to the first embodiment.

Therefore, as illustrated in FIG. 3A, when the height H of the prism 114 is set to be equal to or more than $W \tan(\sin^{-1}(1/n))$ with respect to the prism width W, the light beam reaching the prism 114 can efficiently exit to the outside. In this embodiment, the material of the light guiding member 110 is an acrylic resin (PMMA), and hence the refractive index n is 1.49. Therefore, the height H of the prism 114 made of the same material is 0.9W or more.

Next, with reference to FIG. 3B, a case where the height falls below $W \tan(\sin^{-1}(1/n))$, which is the lower limit value of Conditional Expression (1), is described. When the height H of the prism is less than 0.9W, light is totally reflected at the bottom surface and the side surface of the prism 114 so that, as indicated by the light beam A1 in FIG. 3B, the light travels toward the first side surface 112 being the exit surface without exiting from the prism 114 to the outside. Among the light beams reaching the first side surface 112, light that does not satisfy the total reflection angle exits from the first side surface 112 to cause an unexpected local main scanning ripple.

When the height exceeds 2W, which is the upper limit value of Conditional Expression (1), the prism 114 becomes long and thin relative to the width W. Therefore, when the light guiding member is molded, there arises a problem in that a resin does not easily flow in the mold. Therefore, the prism height H is desired to be within 2W.

In this embodiment, the specific numerical values are as follows. The center interval (pitch) P of the plurality of prisms 114 arranged in the longitudinal direction (main scanning direction) is constant in the entire 320-mm region in the main scanning direction (P=1.5 mm). Further, in the vicinity of the end surface (incident surface) 111 into which light from the light source 109a or the light source 109b enters, the prism 114 has the minimum width Wmin of 0.15 mm and a minimum height Hmin of 0.15 mm. Further, in the vicinity of the center portion of the light guiding member 110 in the longitudinal direction (main scanning direction), the prism 114 has the maximum width Wmax of 0.30 mm and a maximum height Hmax of 0.30 mm.

In the vicinity of the end surface (incident surface) 111, the lower limit value of Conditional Expression (1) is W tan(sin$^{-1}$(1/n))=0.14, and the upper limit value thereof is 2W=0.3. Therefore, Hmin=0.15 satisfies Conditional Expression (1). Further, in the vicinity of the center portion in the longitudinal direction (main scanning direction), the lower limit value of Conditional Expression (1) is W tan(sin$^{-1}$(1/n))=0.27, and the upper limit value thereof is 2W=0.6. Therefore, Hmax=0.30 satisfies Conditional Expression (1).

(Diffusion/Reflection Portion 116)

Figure 4:
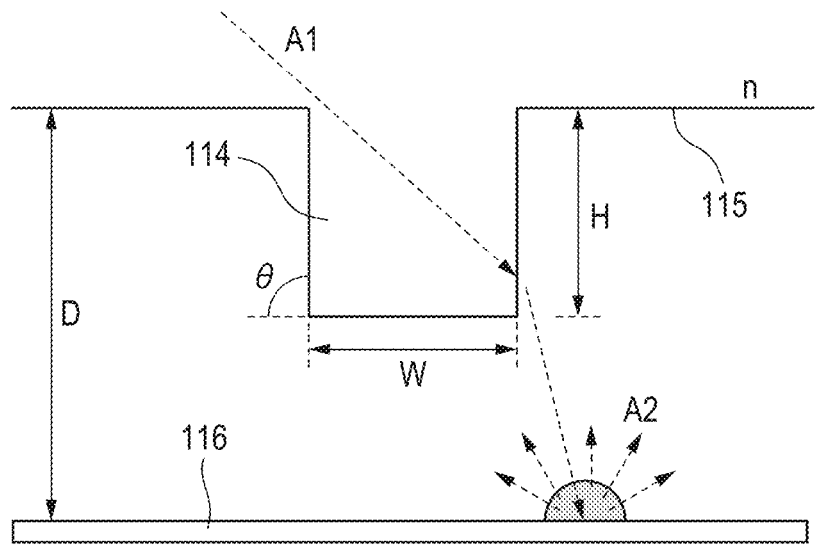
FIG. 4 is a main-part enlarged view of a second side surface and a diffusion/reflection member of the light guiding unit according to the first embodiment.
Figure 5:
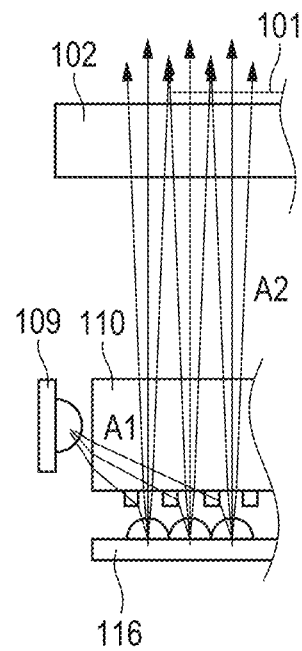
FIG. 5 is a main-part enlarged view in a region near an end surface (incident surface) of the light guiding unit according to the first embodiment.

Next, the diffusion/reflection member 116 is described with reference to FIG. 4 and FIG. 5. The diffusion/reflection member 116 opposed to the second side surface 115 has a function of Lambert-reflecting light that has been refracted by the side surface of the prism 114 to cause the light to enter the reflection surface (first region) of the second side surface 115, to thereby cause this transmission light to exit from the first side surface 112.

When the maximum height of the prism 114 is represented by Hmax and the height from the second side surface 115 to the diffusion/reflection member 116 (distance of an air layer) is represented by D, the diffusion/reflection member 116 is arranged to satisfy the following expression (2). Note that, as described above, the height from the second side surface 115 to the first side surface 112 is represented by T.

$$H\max \leq D \leq T/3 \qquad (2)$$

It is more preferred that the diffusion/reflection member 116 be arranged to satisfy the following expression.

$$1.1 H\max \leq D \leq T/3 \qquad (2a)$$

Conditional Expression (2) defines the arrangement of the diffusion/reflection member 116. Through definition of the air layer distance D within the range of Conditional Expression (2), the light guiding member 110 and the diffusion/reflection member 116 can be appropriately arranged.

The lower limit value of Conditional Expression (2) is Hmax (in this case, the light guiding member 110 and the diffusion/reflection member 116 are brought into contact with each other), and is more desirably 1.1Hmax. When the air layer distance falls below the lower limit value of 1.1Hmax, the interval between the height Hmax of the prism 114 and the diffusion/reflection member 116 is dense, which may increase the probability that the prism 114 and the diffusion/reflection member 116 are brought into contact with each other due to the positional misalignment of the light guiding member 110. The prism 114 is easily damaged due to the contact, and hence it is desired that the air layer distance D be larger than 1.1Hmax.

When the air layer distance exceeds T/3 being the upper limit value of Conditional Expression (2), the following situation occurs. That is, the interval between the light guiding member 110 and the diffusion/reflection member 116 is large, and light A2 diffused by the diffusion/reflection member 116 is emitted as leakage light to the outside from the gap between the light guiding member 110 and the diffusion/reflection member 116 before reaching the second side surface 115 again.

In this embodiment, the air layer distance D is 0.6 mm, the lower limit value of Conditional Expression (2) is Hmax=0.3 (more preferably, 1.1Hmax=0.33), and the upper limit value thereof is T/3=2.0. Therefore, D=0.6 satisfies Conditional Expression (2).

Next, the inclined angle of the side surface of the prism 114 is described. When the inclined angle of the prism 114 is represented by θ (FIG. 4), the prism 114 is shaped to satisfy the following expression (3).

$$80° \leq \theta \leq 90° \qquad (3)$$

Conditional Expression (3) defines the inclined angle of the prism 114. Through definition of the inclined angle θ of the prism within the range of Conditional Expression (3), light can exit from the prism 114.

When the inclined angle falls below 80° being the lower limit value of Conditional Expression (3), the inclined angle of the prism 114 is shallow, and hence the amount of transmission light is reduced. Further, when the inclined angle exceeds 90° being the upper limit value of Conditional Expression (3), the molded light guiding member 110 has the prism 114 whose bottom surface width is larger than the root width, and hence the light guiding member 110 cannot be removed from the mold.

The light beam A1 (FIG. 5) entering the prism 114 is refracted at (transmitted through) the side surface of the prism 114, and is diffused by the diffusion/reflection member 116 arranged to be separated from the second side surface 115 by the distance D. The diffused reflection light A2 (FIG. 4 and FIG. 5) becomes Lambert light to enter the reflecting portion (first region) of the second side surface 115 of the light guiding member, further enter the first side surface 112, and exit from the first side surface 112 to illuminate the original 101. Due to the characteristics of the Lambert light, the light normal to the diffusion/reflection member 116 is the light having the highest intensity. Therefore, the presence of the normal light can increase the illuminance distribution in the vicinity of the end surface (incident surface) 111 of the light guiding member.

In this embodiment, the inclined angle θ is 90°, the lower limit value of Conditional Expression (3) is 80°, and the upper limit value thereof is 90°. Therefore, θ=90° satisfies Conditional Expression (3). Therefore, while suppressing the length of the light guiding member 110 in the longitudinal direction (main scanning direction) to 320 mm, the illuminance in the vicinity of the end surface (incident surface) 111 of the light guiding member can be increased, and the shadow of the three-dimensional object can be suppressed.

Second Embodiment

The basic configuration of the image reading apparatus in this embodiment in which the material of the light guiding member is changed and the array configuration of the prisms is changed is similar to that in the first embodiment. Now, parts different from the first embodiment are described. In this embodiment, the material of a light guiding member 210 is changed to polycarbonate (PC) having a higher flame resistance than that of an acrylic resin (PMMA) used in the first embodiment. The refractive index n of polycarbonate is 1.59.

Note that, elements of the light guiding member 210 other than the material thereof are similar to those in the first embodiment.

Figure 6:
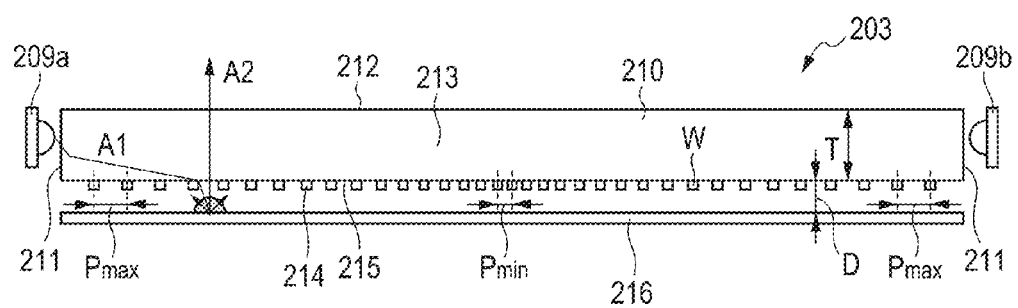
FIG. 6 is a main-part schematic view of an original illuminating device using a light guiding unit according to a second embodiment of the present invention.

That is, in FIG. 6, the light guiding unit obtained by excluding light sources 209a and 209b from an original illuminating device 203 includes the light guiding member 210 and a diffusion/reflection member 216. The light guiding member 210 has end surfaces (incident surfaces) 211 into which light from the light source 209a and the light source 209b, which are arranged at both the end portions in the longitudinal direction (main scanning direction), enters. Further, the light guiding member 210 has a first side surface 212 serving as the exit surface from which light from the light sources exits toward the original, and a second side surface 215 that is opposed to the first side surface. The second side surface 215 includes a first region and a second region, and extends in the longitudinal direction (main scanning direction). Further, the light guiding member 210 has two opposing reflection side surfaces 213 that connect the first side surface 212 and the second side surface 215 to each other.

In this case, the reflection surface is formed in the first region of the second side surface 215. Further, in the second region of the second side surface 215, a prism having a rectangular shape in a first section including the longitudinal direction and being orthogonal to the second side surface is formed on a side separating from the first side surface. In the second side surface 215, a plurality of first regions and a plurality of second regions are formed alternately in the longitudinal direction.

In this embodiment, the "rectangular shape" refers to not only a rectangular shape, but also a substantially rectangular shape. It is preferred that the angle (180°−θ) of a lateral side with respect to a bottom side be 90°≤180°−θ≤100° (that is, 80°≤θ≤90°).

In the second side surface 215, the reflection surface is formed in the first region, which functions as a reflecting portion that reflects incident light with an incident angle of a critical angle or more (but functions as a transmitting portion for incident light with an incident angle smaller than the critical angle). Further, in the second region of the second side surface 215, a prism (cuboid prism) 214 having a rectangular shape in the first section including the longitudinal direction and being orthogonal to the second side surface and in the second section orthogonal to the first section is formed as a protruding portion on the side separating from the first side surface. In this embodiment, the width W of the prism 214 is constant in the entire 320-mm region in the longitudinal direction (main scanning direction).

When the center interval (pitch) P of the prism 214 has the minimum pitch represented by Pmin and the maximum pitch represented by Pmax, the pitch P is varied in the longitudinal direction from Pmax in the vicinity of the end surface 211 into which light from the light source 209a enters to Pmin in the vicinity of the center portion in the longitudinal direction. The pitch P in the vicinity of the end surface 211 into which light from the light source 209b on the opposite side to the light source 209a enters is similarly varied in the longitudinal direction (main scanning direction) from Pmax to Pmin in the vicinity of the center portion in the longitudinal direction.

When the width of the prism 214 is represented by W, the height thereof is represented by H, and the refractive index of the light guiding member is represented by n, the prism 214 satisfies the following conditional expression.

$$W \tan(\sin^{-1}(1/n)) \leq H \leq 2W \quad (4)$$

In this embodiment, the specific numerical values are as follows. The width W of the prism 214 is constant in the entire 320-mm region in the longitudinal direction (main scanning direction) (W=0.2 mm), and the height H thereof is constant in the entire 320-mm region in the longitudinal direction (main scanning direction) (H=0.3 mm). In the vicinity of the end surface 211 into which light from the light source 209a or the light source 209b enters, the maximum pitch Pmax of the prisms 214 is 2.5 mm. In the vicinity of the center portion in the longitudinal direction, the minimum pitch Pmin of the prisms 214 is 0.5 mm. The lower limit value of Conditional Expression (4) is W tan(sin$^{-1}$(1/n))=0.16, and the upper limit value thereof is 2W=0.4. Therefore, H=0.30 satisfies Conditional Expression (4).

(Diffusion/Reflection Portion)

Figure 7:
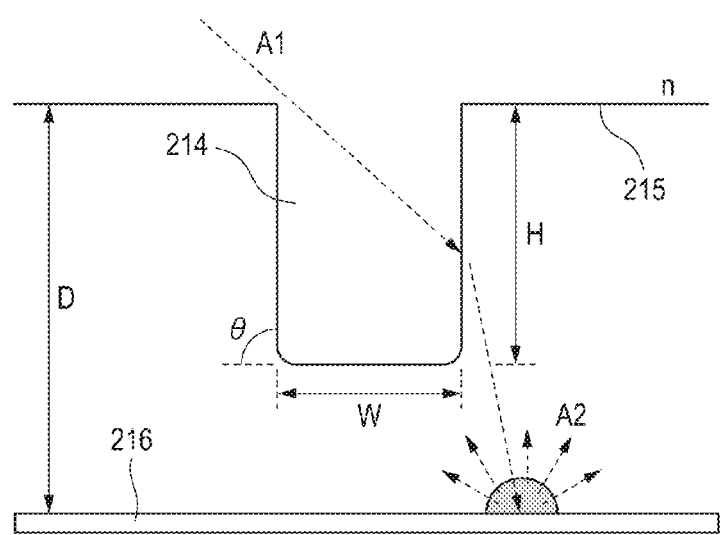
FIG. 7 is a main-part enlarged view of a second side surface and a diffusion/reflection member of the light guiding unit according to the second embodiment.

Next, the diffusion/reflection member 216 is described with reference to FIG. 7. The diffusion/reflection member 216 opposed to the second side surface 215 has a function of Lambert-reflecting light that has been refracted by the side surface of the prism 214 to cause the light to enter the reflection surface (first region) of the second side surface 215, to thereby cause this transmission light to exit from the first side surface 212.

When the maximum height of the prism 214 is represented by Hmax, the height from the second side surface 215 to the diffusion/reflection member 216 (distance of an air layer) is represented by D, and the height from the second side surface 215 to the first side surface 212 is represented by T, the diffusion/reflection member 216 is arranged to satisfy the following expression (5).

$$H\max \leq D \leq T/3 \quad (5)$$

It is more preferred that the diffusion/reflection member 216 be arranged to satisfy the following expression.

$$1.1 H\max \leq D \leq T/3 \quad (5a)$$

In this embodiment, the air layer distance D is 1.0 mm, the lower limit value of Conditional Expression (5) is Hmax=0.3, more preferably 1.1Hmax=0.33, and the upper limit value thereof is T/3=2.0. Therefore, D=1.0 satisfies Conditional Expression (5).

Next, the inclined angle of the side surface of the prism 214 is described. When the inclined angle of the prism 214 is represented by θ (FIG. 7), the prism 214 is shaped to satisfy the following expression (6).

$$80° \leq \theta \leq 90° \quad (6)$$

Note that, in this embodiment, the corners of the bottom surface of the prism 214 are chamfered. Therefore, the prism width W corresponds to a width in a range excluding the chamfered portions, and the inclined angle θ corresponds to an angle in a range excluding the chamfered portions. In this embodiment, the inclined angle θ is 90°, the lower limit value of Conditional Expression (6) is 80°, and the upper limit value thereof is 90°. Therefore, θ=90° satisfies Conditional Expression (6). Therefore, while suppressing the length of the light guiding member 210 in the longitudinal direction (main scanning direction) to 320 mm, the illuminance in the vicinity of the end surface (incident surface) 211 can be increased, and the shadow of the three-dimensional object can be suppressed.

Third Embodiment

Figure 8:
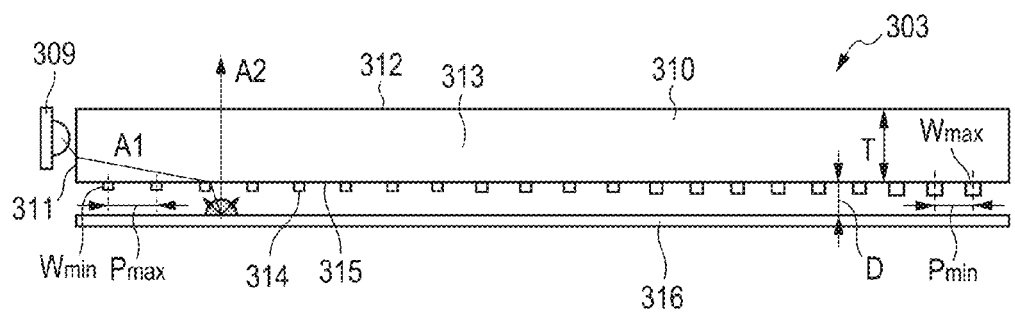
FIG. 8 is a main-part schematic view of an original illuminating device using a light guiding unit according to a third embodiment of the present invention.

In the first and second embodiments, the light illuminating device including the light sources opposed to both the end portions of the light guiding member in the longitudinal direction is described, but in this embodiment, the light illuminating device includes a light source opposed to one end portion (one side) of the light guiding member in the longitudinal direction. That is, as illustrated in FIG. 8, in this embodiment, one light source 309 being a high-brightness white LED is arranged for one end portion of a light guiding member 310 in the longitudinal direction (main scanning direction). Further, in this embodiment, the array configuration of prisms 314 is changed, and the inclined angle θ (FIG. 9) is set to 85° instead of 90°. Note that, the basic configuration of the image reading apparatus is similar to that of the first embodiment.

That is, in FIG. 8, the light guiding unit obtained by excluding the light source 309 from an original illuminating device 303 includes the light guiding member 310 and a diffusion/reflection member 316. The light guiding member 310 has an end surface (incident surface) 311 into which light from the light source 309, which is arranged at one end portion in the longitudinal direction (main scanning direction), enters. Further, the light guiding member 310 has a first side surface 312 serving as the exit surface from which light from the light source exits toward the original, and a second side surface 315 that is opposed to the first side surface. The second side surface 315 includes a first region and a second region, and extends in the longitudinal direction (main scanning direction). Further, the light guiding member 310 has two opposing reflection side surfaces 313 that connect the first side surface 312 and the second side surface 315 to each other.

In this case, the reflection surface is formed in the first region of the second side surface 315. Further, in the second region of the second side surface 315, a prism having a rectangular shape in a first section including the longitudinal direction and being orthogonal to the second side surface is formed on a side separating from the first side surface. In the second side surface 315, a plurality of first regions and a plurality of second regions are formed alternately in the longitudinal direction.

In the second side surface 315, the reflection surface is formed in the first region, which functions as a reflecting portion that reflects incident light with an incident angle of a critical angle or more (but functions as a transmitting portion for incident light with an incident angle smaller than the critical angle). Further, in the second region of the second side surface 315, a prism (cuboid prism) 314 having a rectangular shape in the first section including the longitudinal direction and being orthogonal to the second side surface and in the second section orthogonal to the first section is formed as a protruding portion on the side separating from the first side surface.

In this embodiment, when the center interval (pitch) P of the prisms 314 has a minimum pitch represented by Pmin and a maximum pitch represented by Pmax and the width W of the prism 314 has a minimum width represented by Wmin and a maximum width represented by Wmax, the configuration is made as follows. That is, the pitch P and the width W are varied in the longitudinal direction from Pmax and Wmin in the vicinity of the end surface (incident surface) 311 to Pmin and Wmax in the vicinity of the other end portion in the longitudinal direction (main scanning direction).

Figure 9:
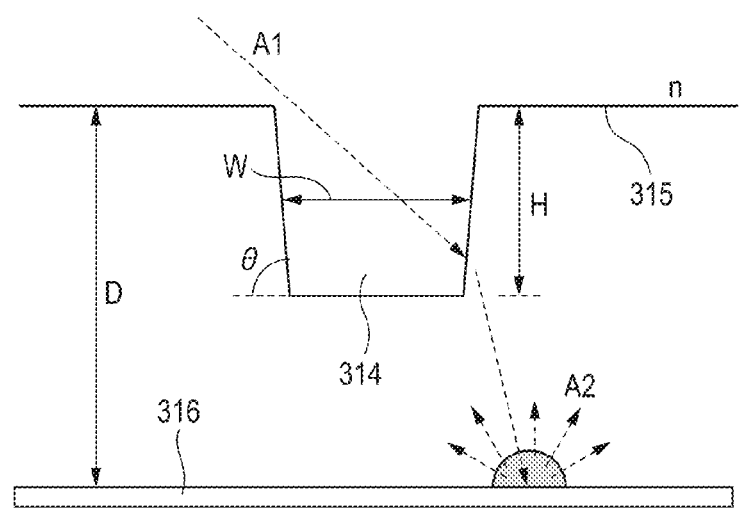
FIG. 9 is a main-part enlarged view of a second side surface and a diffusion/reflection member of the light guiding unit according to the third embodiment.

As illustrated in FIG. 9, when the width (half width) as an average width in one prism 314 (inclined angle θ is 85° instead of 90°) is represented by W, the height is represented by H, and the refractive index of the light guiding member is represented by n, the prism 314 satisfies the following conditional expression (7).

$$W\tan(\sin^{-1}(1/n)) \leq H \leq 2W \tag{7}$$

In this embodiment, the specific numerical values are as follows. In the vicinity of the end surface (incident surface) 311, the prism 314 has the maximum pitch Pmax of 1.5 mm, the minimum width Wmin of 0.2 mm, and the minimum height Hmin of 0.2 mm. Further, in the vicinity of the other end portion in the longitudinal direction (main scanning direction), the prism 314 has the minimum pitch Pmin of 0.5 mm, the maximum width Wmax of 0.3 mm, and the maximum height Hmax of 0.3 mm.

In the vicinity of the end surface (incident surface) 311, the lower limit value of Conditional Expression (7) is $W\tan(\sin^{-1}(1/n))=0.18$, and the upper limit value thereof is 2W=0.4. Therefore, H=0.20 satisfies Conditional Expression (7). Further, in the vicinity of the other end portion in the longitudinal direction (main scanning direction), the lower limit value of Conditional Expression (7) is $W\tan(\sin^{-1}(1/n))=0.27$, and the upper limit value thereof is 2W=0.6. Therefore, H=0.30 satisfies Conditional Expression (7).

(Diffusion/Reflection Portion)

Next, the diffusion/reflection member 316 is described with reference to FIG. 9. The diffusion/reflection member 316 opposed to the second side surface 315 has a function of Lambert-reflecting light that has been refracted by the side surface of the prism 314 to cause the light to enter the reflection surface (first region) of the second side surface 315, to thereby cause this transmission light to exit from the first side surface 312.

When the maximum height of the prism 314 is represented by Hmax, the height from the second side surface 315 to the diffusion/reflection member 316 (distance of an air layer) is represented by D, and the height from the second side surface 315 to the first side surface 312 is represented by T, the diffusion/reflection member 316 is arranged to satisfy the following expression (8).

$$H\max \leq D \leq T/3 \tag{8}$$

It is more preferred that the diffusion/reflection member 316 be arranged to satisfy the following expression.

$$1.1H\max \leq D \leq T/3 \tag{8a}$$

In this embodiment, the air layer distance D is 0.5 mm, the lower limit value of Conditional Expression (8) is Hmax=0.3, more preferably 1.1Hmax=0.33, and the upper limit value thereof is T/3=2.0. Therefore, D=0.5 satisfies Conditional Expression (8).

Next, the inclined angle of the side surface of the prism 314 is described. In this embodiment, the inclined angle θ is 85°, and a draft angle of 5° is provided so that the molded light guiding member 310 can be easily removed from the mold. The prism width W is an average of the minimum width and the maximum width in the one prism 314 (average width).

The prism 314 in this embodiment is shaped so as to satisfy the following expression (9).

$$80° \leq \theta \leq 90° \tag{9}$$

In this embodiment, θ=85° satisfies Conditional Expression (9). Therefore, while suppressing the length of the light guiding member 310 in the longitudinal direction (main scanning direction) to 320 mm, the illuminance in the vicinity of the end surface (incident surface) 311 can be increased, and the shadow of the three-dimensional object can be suppressed.

Modified Examples

The exemplary embodiments of the present invention are described above, but the present invention is not limited to these embodiments and can be modified and changed variously within the scope of the gist thereof.

Modified Example 1

In the above-mentioned embodiments, the LED is used as the light source, but similar effects can be obtained even with use of an organic electroluminescence (organic EL) element or a light bulb.

Modified Example 2

Further, in the above-mentioned embodiments, the refractive index of the prism is equal to the refractive index of the light guiding member (the prism and the light guiding member are integrally molded with the same material), but the present invention is not limited thereto, and the refractive index of the prism may be different from the refractive index of the light guiding member (the prism and the light guiding member may be made of different materials).

Modified Example 3

Further, in the above-mentioned embodiments, as the prism, in the second region of the second side surface, there is used a prism (cuboid prism) having a rectangular shape in both of the first section including the longitudinal direction and being orthogonal to the second side surface and the second section orthogonal to the first section, but the present invention is not limited thereto. That is, in the second region of the second side surface, there may be used a prism having a rectangular shape in the first section including the longitudinal direction and being orthogonal to the second side surface, and having an arbitrary shape that is not the rectangular shape in the second section orthogonal to the first section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-193351, filed Sep. 24, 2014, which is hereby incorporated by reference herein in its entirety.

What is claimed is:

1. A light guiding unit, which is to be used in an image reading apparatus configured to read an original, the light guiding unit comprising:
   a light guiding member comprising an incident surface, an exit surface that is elongated in a first direction, and a light guiding surface opposed to the exit surface; and
   a diffusion member opposed to the light guiding surface,
   wherein light entering the light guiding member from the incident surface is guided via the light guiding surface and the diffusion member to the exit surface, and exits from the exit surface to illuminate the original,
   wherein the light guiding member further comprises a plurality of prisms arrayed in the first direction on the light guiding surface on a side opposed to the diffusion member,
   wherein each of the plurality of prisms has a rectangular shape in a first section including the first direction and being perpendicular to the light guiding surface, and
   wherein each of the plurality of prisms satisfies the following condition:

$$W\tan(\sin^{-1}(1/n)) \leq H \leq 2W,$$

where W represents a width of the each of the plurality of prisms in the first section, H represents a height of the each of the plurality of prisms, and n represents a refractive index of the light guiding member.

2. A light guiding unit according to claim 1, wherein the each of the plurality of prisms has a rectangular shape also in a second section perpendicular to the first section perpendicular to the light guiding surface.

3. A light guiding unit according to claim 1, wherein light refracted via each of the plurality of prisms and diffused by the diffusion member to travel toward the light guiding surface passes through the light guiding surface to exit from the exit surface.

4. A light guiding unit according to claim 1, wherein the diffusion member is opposed to the light guiding surface through an air layer.

5. A light guiding unit according to claim 4, wherein the following condition is satisfied:

$$H\max \leq D \leq T/3,$$

where D represents a height of the air layer from the light guiding surface to the diffusion member, T represents a height from the light guiding surface to the exit surface, and Hmax represents a maximum height of corresponding one of the plurality of prisms arrayed in the first direction.

6. A light guiding unit according to claim 1, wherein the plurality of prisms have a constant center interval in the first direction, and the width thereof is increased as being distanced from the incident surface in the first direction.

7. A light guiding unit according to claim 1, wherein the plurality of prisms have the constant width, and a center interval in the first direction thereof is decreased as being distanced from the incident surface in the first direction.

8. A light guiding unit according to claim 1, wherein the plurality of prisms have the width and a center interval in the first direction that are non-constant.

9. A light guiding unit according to claim 1, wherein the following condition is satisfied:

$$80° \leq \theta \leq 90°,$$

where $(180°-\theta)$ represents an inclined angle of the each of the plurality of prisms with respect to the light guiding surface.

10. A light illuminating device, comprising:
    a light source; and
    a light guiding unit,
    the light guiding unit comprising:
      a light guiding member comprising an incident surface, an exit surface that is elongated in a first direction, and a light guiding surface opposed to the exit surface; and
      a diffusion member opposed to the light guiding surface,
    wherein light entering the light guiding member from the incident surface is guided via the light guiding surface and the diffusion member to the exit surface, and exits from the exit surface to illuminate an original,
    wherein the light guiding member further comprises a plurality of prisms arrayed in the first direction on the light guiding surface on a side opposed to the diffusion member,
    wherein each of the plurality of prisms has a rectangular shape in a first section including the first direction and being perpendicular to the light guiding surface, and
    wherein each of the plurality of prisms satisfies the following condition:

$$W\tan(\sin^{-1}(1/n)) \leq H \leq 2W,$$

where W represents a width of the each of the plurality of prisms in the first section, H represents a height of the each of the plurality of prisms, and n represents a refractive index of the light guiding member.

11. An image reading apparatus, comprising:
   a light illuminating device;
   an image reading optical system; and
   an image reading unit arranged on an image plane of the image reading optical system,
   the light illuminating device comprising:
      a light source; and
      a light guiding unit,
      the light guiding unit comprising:
         a light guiding member comprising an incident surface, an exit surface that is elongated in a first direction, and a light guiding surface opposed to the exit surface; and
         a diffusion member opposed to the light guiding surface,
   wherein light entering the light guiding member from the incident surface is guided via the light guiding surface and the diffusion member to the exit surface, and exits from the exit surface to illuminate an original,
   wherein the light guiding member further comprises a plurality of prisms arrayed in the first direction on the light guiding surface on a side opposed to the diffusion member,
   wherein each of the plurality of prisms has a rectangular shape in a first section including the first direction and being perpendicular to the light guiding surface, and
   wherein each of the plurality of prisms satisfies the following condition:

$W \tan(\sin^{-1}(1/n)) \leq H \leq 2W$, where W represents a width of the each of the plurality of prisms in the first section, H represents a height of the each of the plurality of prisms, and n represents a refractive index of the light guiding member.

* * * * *